May 11, 1965

G. D. BRODE 3,183,366

SIGNAL TRANSLATING APPARATUS

Filed Dec. 31, 1959

3 Sheets-Sheet 1

INVENTOR
GERALD D. BRODE
BY Bernard N. Wiener
ATTORNEY

United States Patent Office 3,183,366
Patented May 11, 1965

3,183,366
SIGNAL TRANSLATING APPARATUS

Gerald D. Brode, Sayre, Pa., assignor to International Business Machines Corporation, New York, N.Y., a corporation of New York Filed Dec. 31, 1959, Ser. No. 863,143
2 Claims. (Cl. 307—88.5)

This invention relates to signal translating apparatus and more particularly to signal translating apparatus wherein initiation of conduction in a transistor improves a slope characteristic of the output signal from another transistor of opposite conductivity type.

Capacitance and resistance associated with the collector of a conducting transistor connected in the grounded emitter configuration as a basic inverter causes a slope characteristic of an output signal therefrom to be less than instantaneous when base current flow is instantly lessened. This results from the interval of time required to charge the collector capacitance through the collector resistance. The magnitude of the interval is directly proportional to the product of the values of the capacitance and resistance, known as the RC time constant.

This invention reduces the collector capacitance charging time interval for a transistor connected in the common emitter configuration as a basic inverter by utilizing a transistor of the opposite conductivity type to short temporarily its collector resistance. The shorting transistor receives a voltage signal at its base to turn it on at approximately the same time that the base current flow to the common emitter transistor is terminated. The shorting transistor has its collector-emitter junction connected across the collector resistance of the common emitter transistor. Thereby, a slope characteristic of the output signal of the latter transistor is improved.

More specifically, one embodiment of the invention utilizes a PNP conductivity type transistor to short the collector resistance of an NPN conductivity type transistor connected in the common emitter configuration as a basic inverter while its collector capacitance is charging as it goes out of conduction. When the NPN transistor is conducting, the negative going signal which turns it off arrives at its base simultaneously with the arrival of a negative going signal at the base of the PNP transistor which initiates conduction therein. The collector and emitter of the PNP transistor are at approximately the same potential after conduction has been initiated therein, and it conducts but momentarily. The signal which initiates its conduction is derived from the input signal. In effect, the input signal serves to time precisely the initiation of conduction in the PNP shorting transistor as the base current of the common emitter NPN transistor ceases to flow.

Another embodiment of the invention is obtained by replacing each transistor of the above-described embodiment by a transistor of opposite conductivity type and reversing the polarities of source voltages, diodes and input signal.

An object of this invention is to provide apparatus and method for reducing the collector capacitance charging time of a transistor connected in the common emitter configuration as a basic inverter.

Another object of this invention is to provide an inverter circuit which incorporates a network in accordance with this invention to improve a slope characteristic of its output signal.

A further object of this invention is to provide a bistable circuit which incorporates a network in accordance with this invention to improve a slope characteristic of its output signal.

Still another object of this invention is to provide a monostable circuit which incorporates a network in accordance with this invention to improve a slope characteristic of its output signal.

Yet another object of this invention is to provide an astable circuit which incorporates a network in accordance with this invention to improve a slope characteristic of its output signal.

The foregoing and other objects, features and advantages of the invention will be apparent from the following more particular description of preferred embodiments thereof as illustrated in the accompanying drawings of which:

Figure 3:
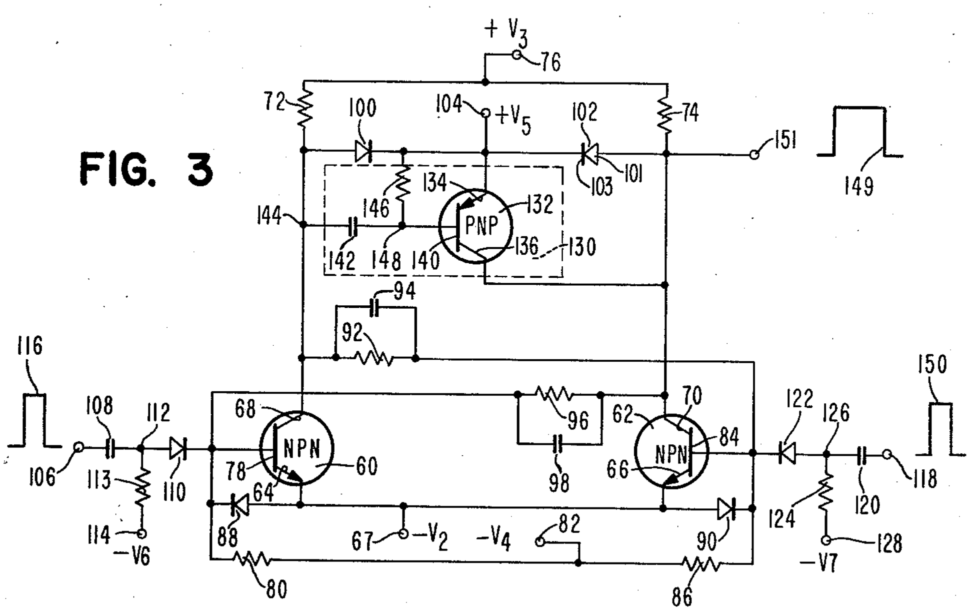
FIG. 3 is a diagram of a bistable circuit, incorporating a network in accordance with this invention, in which a PNP transistor is utilized to reduce collector capacitance charging time of an NPN transistor, thereby increasing the rise time characteristic of the lagging edge of the output signal.
Figure 4A:
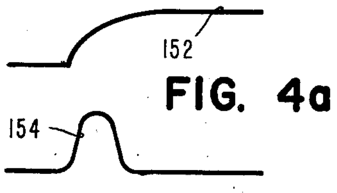
Figure 4B:
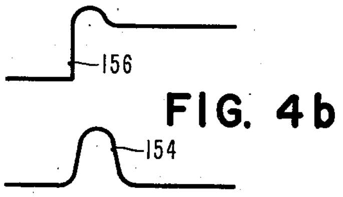
Figure 5:
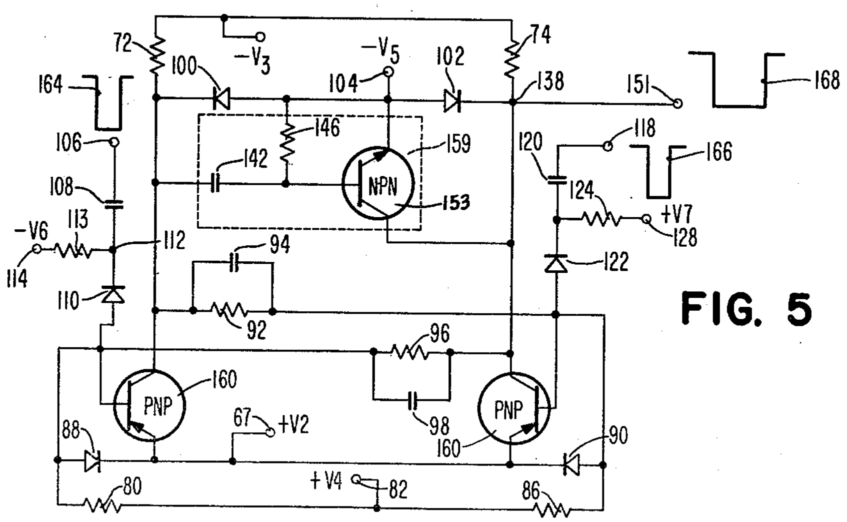
Figure 6:
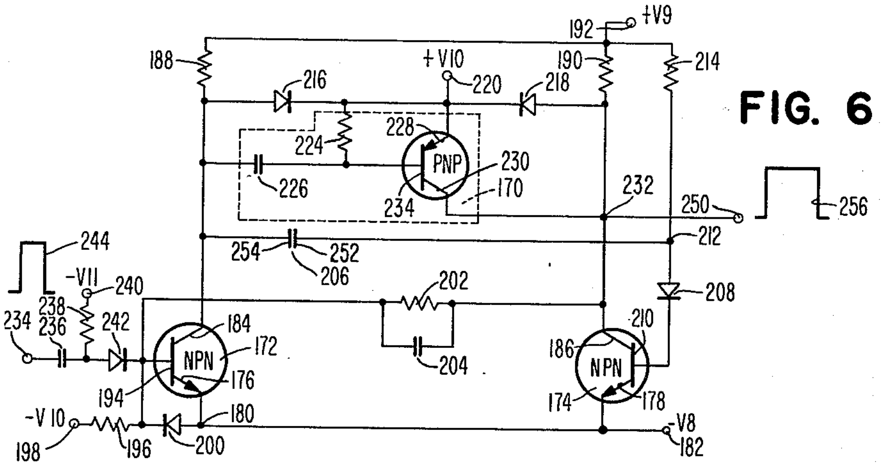
Figure 7:
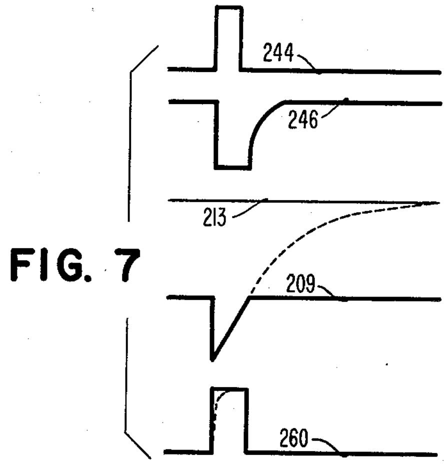
Figure 8:
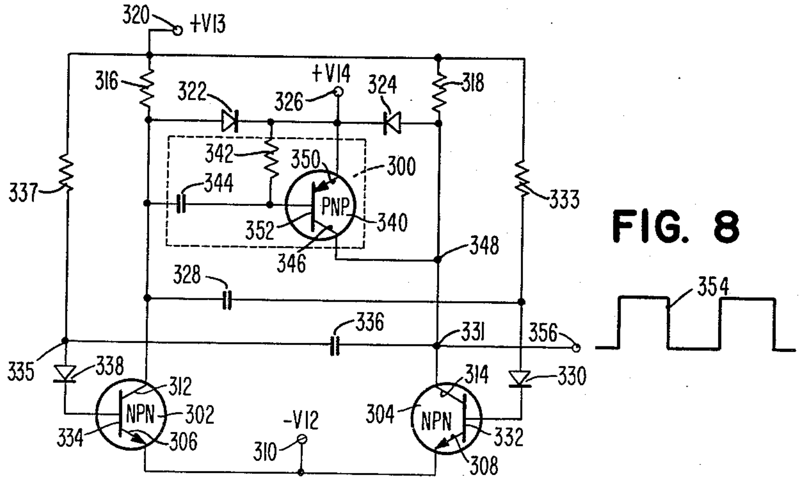

FIG. 4*a* illustrates the nature of the collector potential when one of the transistors of the bistable circuit of FIG. 3 goes out of conduction before the network has been incorporated in accordance with this invention;

FIG. 4*b* illustrates the nature of the collector potential when one of the transistors of the bistable circuit of FIG. 3 goes out of conduction after the network has been incorporated in accordance with this invention;

FIG. 5 is a diagram of a bistable circuit, incorporating a network in accordance with this invention, in which an NPN transistor is utilized to reduce the collector capacitance charging time of a PNP transistor, thereby improving the fall time characteristic of the lagging edge of the output signal;

FIG. 6 is a diagram of a monostable circuit, incorporating a network in accordance with this invention, in which a PNP transistor is utilized to reduce the collector capacitance charging time of an NPN transistor, thereby improving the rise time characteristic of the lagging edge of the output signal;

FIG. 7 provides a plurality of waveforms illustrating the operation of the monostable circuit of FIG. 6; and FIG. 8 is a diagram of an astable circuit, incorporating a network in accordance with this invention, in which a PNP transistor is utilized to reduce collector capacitance charging time of an NPN transistor, thereby improving the rise time characteristic of the lagging edge of the output signal.

*Inverter circuit*

Figure 1:
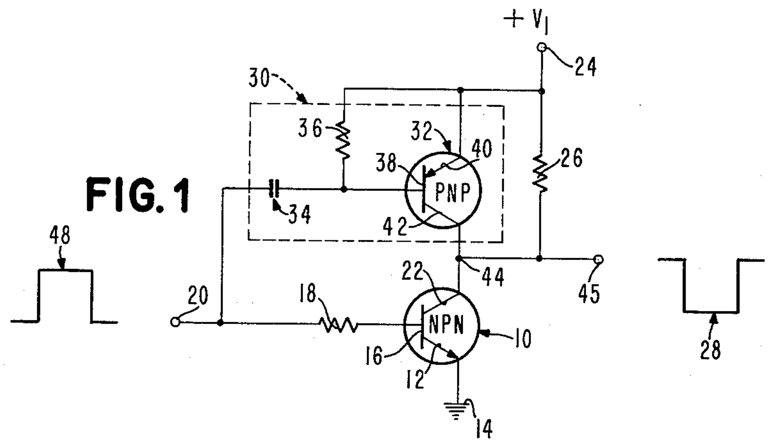
FIG. 1 is a diagram of an inverter circuit, incorporating a network in accordance with this invention, in which a PNP transistor is utilized to reduce the collector capacitance charging time of an NPN transistor, thereby improving the rise time characteristic of the lagging edge of the output signal.

The essence of this invention will be understood with reference to FIG. 1, which is a diagram of an inverter circuit in accordance therewith. An NPN transistor 10 is connected in the grounded emitter configuration as a basic inverter. The emitter 12 thereof is connected to ground 14, and its base 16 is connected via resistor 18 to signal input terminal 20. Its collector 22 is connected to positive voltage supply $+V_1$ at terminal 24 via collector resistance 26. The network 30 acts to short resistor 26 from the collector 22 circuit during the collector capacitance charging time of transistor 10. Network 30 includes transistor 32, capacitor 34 and resistor 36. Capacitor 34 is connected between the input terminal 20 and base 38 of transistor 32. Its emitter 40 is connected to voltage supply terminal 24. Resistor 36 is connected between the base 38 and voltage terminal 24, and collector 42 is connected to collector 22 of transistor 10 at junction 44. The portion of the circuit excluding network 30, when operative to provide an output signal 28 at output terminal 45 as a result of an input signal 48, has a relatively long collector capacitance charging time after current to the base 16 of transistor 10 ceases to flow. This causes the lagging edge of output signal 28 to have significant rise time.

The inverter circuit illustrated in FIG. 1 provides an output pulse 28 having a fast fall time leading edge and a fast rise time lagging edge even though the respective and lagging edges of input signal 48 may have slow rise and fall times. Prior to application of input signal 48 at input terminal 20, the base-to-emitter junction of transistor 10 is back biased and transistor 10 is out of conduction. Transistor 32 is also out of conduction since its base 38, collector 42 and emitter 40 are at the same potential; i.e. voltage $+V_1$. With the application of leading edge of input 48 to input terminal 20, transistor 10 rapidly goes into conduction causing current to flow through its from voltage terminal 24 via resistor 26 to ground 14. The RC voltage differentiating network comprising capacitor 34 and resistor 36 causes a positive going voltage to be applied to base 38, counteracting the tendency of transistor 32 to go into conduction as the result of the voltage drop across resistor 26.

When the lagging edge input signal 48 causes base 16 current to cease flowing, the RC network comprising capacitor 34 and resistor 36 differentiates said lagging edge to provide a negative going pulse to base 38 of transistor 32. This causes transistor 32 to go sharply into conduction and directly connect voltage $+V_1$ at terminal 24 to collector 22 of transistor 10. As the internal resistance of transistor 32 is very much smaller than collector resistance 26, the collector capacitance of transistor 10 rapidly charges. The potential drop across the collector-emitter junction of transistor 32 is the voltage drop across its internal resistance. As this is very small, the transistor 32 immediately shuts off. Thus, once its function of reducing the collector capacitance charging time of transistor 10 has been completed, transistor 32 is removed from the circuit.

Figure 2:
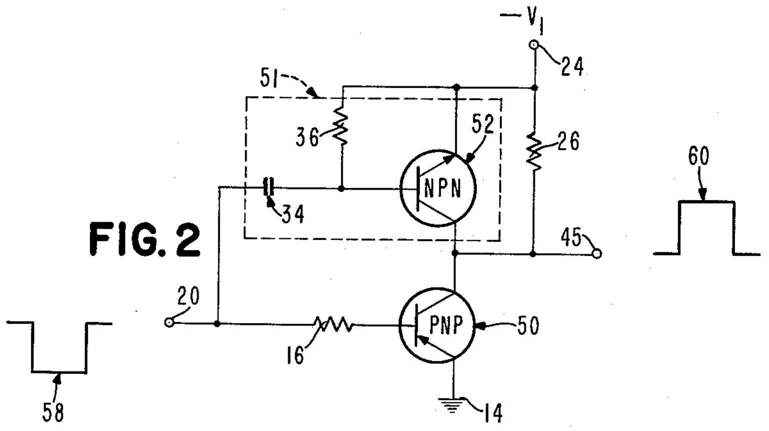
FIG. 2 is a diagram of an inverter circuit, incorporating a network in accordance with this invention, in which an NPN transistor is utilized to reduce the collector capacitance charging time of a PNP transistor, thereby improving the fall time characteristic of the lagging edge of the output signal.

FIG. 2 illustrates the manner in which the inverter circuit of FIG. 1 is altered to incorporate a PNP transistor 50 in the common emitter configuration basic inverter circuit instead of the NPN transistor 10. Network 51 effects the same function as network 30. NPN transistor 52 replaces PNP transistor 32 of network 30. The voltage supply terminal 24 is connected to a negative voltage supply $-V_1$. Thus, a negative input signal 58 applied to input terminal 20 is translated to a positive output signal 60 at output terminal 45.

*Bistable circuit*

FIG. 3 illustrates an improved bistable circuit in accordance with this invention. The circuit includes transistors 60 and 62 of the NPN type, whose respective conduction conditions determine the two stable states of the circuit. Their emitters 64 and 66, respectively, are commoned and connected to source of negative D.C. potential $-V_2$ at voltage terminal 67. The collectors 68 and 70 of transistors 60 and 62 are connected by resistors 72 and 74, respectively, to a source of positive D.C. potential $+V_3$ at voltage terminal 76. Transistor 60 has its base 78 connected via resistor 80 to a source of negative D.C. potential $-V_4$ at voltage terminal 82, and the base 84 of transistor 62 is connected via resistor 86 thereto. Resistors 80 and 86 serve to compensate for temperature variations of their respective transistors 60 and 62. A diode 88 is connected between the emitter 64 and base 78 of transistor 60 in order to stabilize the back bias on the emitter-base junction at a low voltage. A diode 90 is connected between the emitter 66 and base 84 of transistor 62 for the same reason.

Transistors 60 and 62 are arranged in cross-coupling relationship for trigger action. The collector 68 of transistor 60 is connected to the base 84 of transistor 62 by the parallel combination of resistor 92 and capacitor 94; the collector 70 of transistor 62 is connected to the base 78 of transistor 60 by the parallel combination of resistor 96 and capacitor 98. In order to prevent the potentials of the collectors 68 and 70 from increasing all the way to the voltage $+V_3$ when the respective transistor goes out of conduction, diodes 100 and 102 respectively connect them to a source of positive D.C. voltage $+V_5$ at voltage terminal 104, which is less than the voltage $+V_3$. For example, when transistor 62 goes out of conduction, its collector 70 potential rises toward the voltage $+V_3$, but it will stop at a voltage just equal to $+V_5$ plus the voltage drop across diode 102.

The signal input circuit to transistor 60 includes signal input terminal 106, which is connected via capacitor 108 and diode 110 to base 78. A resistor 113 connects the junction 112 between capacitor 108 and diode 110 source of negative D.C. potential $-V_6$ equal to $-V_2$ at voltage supply terminal 114. Resistor 113 references the base 78 potential to that of emitter 64. Capacitor 108 and resistor 113 differentiate the leading edge of input signal 116 to produce a relatively sharp positive pulse for the base 78. A similar signal input circuit is associated with transistor 62. It includes signal input terminal 118, capacitor 120 and diode 122. Resistor 124 connects the junction 126 therebetween to source of negative voltage $-V_7$ equal to $-V_2$ at voltage terminal 128.

The network 130 in accordance with this invention improves the collector capacitance charging time of transistor 62. It includes transistor 132 whose emitter 134 is connected to voltage supply $+V_5$. The collector 136 of transistor 132 is connected to the collector 70 of transistor 62 at junction 138. Its base 140 is connected via capacitor 142 to the collector 68 of transistor 60 at junction 144. Resistor 146 connects junction 148 between base 140 and capacitor 142 to voltage supply $+V_5$ in order to reference the base 140 to the emitter 134 potential when transistor 132 is out of conduction.

The operation of the bistable circuit of FIG. 3, excluding network 130, is as follows. If transistor 62 is in normal conduction, its collector 70 is at a sufficiently negative potential to hold the base emitter junction of transistor 60 out of conduction, and the emitter-collector junction thereof is also out of conduction. As transistor 60 is out of conduction, collector 68 is at a sufficiently positive potential to hold transistor 62 in conduction via resistor 92. In order to change the state of the bistable circuit, a positive signal 116 is applied to input terminal 106. The leading edge thereof is differentiated by capacitor 108 and resistor 113 and passed via diode 110 as a positive voltage spike to the base 78 of transistor 60. This causes the base potential thereof to exceed the emitter 64 potential, and the transistor 60 goes into conduction. As this occurs, the potential of its collector 68 drops toward the emitter 64 potential and via resistor 92 lowers the voltage to the base of transistor 62 to a point when the base goes out of conduction.

Thereafter, collector 70 potential of transistor 62 begins to rise toward the voltage $+V_3$ at voltage supply terminal 76. However, it is stopped short thereof by the action of diode 102 at approximately the voltage $+V_5$ at voltage supply terminal 104. The rise of collector 70 potential keeps the base of transistor 60 relatively positive and the transistor remains in conduction. In the event transistor 62 were initially out of conduction and transistor 60 in conduction, a positive signal 150 at signal output terminal 118 would cause a reversal of the operation described above. An output signal 149 would appear at junction 144.

FIG. 4*a* presents an illustrative curve 152 showing the potential versus time relationship for collector 70 potential at junction 138 for an illustrative input signal 154 at signal input terminal 106. The curve 152 rises exponentially at a gradual slope in response to input signal 154 because of the collector resistance and capacitance.

The operation of the bistable circuit of FIG. 3 with the network 130 incorporated therein in accordance with this invention is as follows. If transistor 62 is in conduction and transistor 60 out of conduction, a positive input signal 116 at signal input terminal 106 causes transistor 60 to conduct. Its collector 68 potential drops sharply and sufficiently lowers the base 84 potential of transistor 62 to terminate base conduction. Simultaneously, the sharp drop in voltage on the collector 68 of transistor 60 is differentiated by capacitor 142 and resistor 146 to present a sharp negative voltage spike to the base 140 of PNP shorting transistor 132. The negative voltage spike initiates emitter-collector conduction in transistor 132, and collector 136 approaches rapidly the emitter 134 potential set by $+V_5$.

Therefore, collector 70 of transistor 62, which is connected to collector 136 at junction 138, rises rapidly toward $+V_5$. The potential at junction 138 is prevented from rising above $+V_5$ by diode 102. Diode 102 conducts as soon as its plate 101 is more positive than its cathode 103 by an amount equal to its normal forward voltage drop. Transistor 132 turns off immediately after it begins to conduct since its collector 136 and emitter 134 are at substantially the same potential. Since the collector 70 potential of transistor 62 has risen very sharply, the base 78 of transistor 60 is sufficiently positive to sustain conduction in the transistor.

FIG. 4*b* presents an illustrative voltage-time curve 156 for collector 70 potential at junction 138 for the illustrative input signal 154, and the junction 138 potential rises sharply. As noted above, when transistor 132 turns on, it causes a short circuit path for the collector 70 of transistor 62 to voltage $+V_5$. Thus, its capacitance is charged rapidly.

Comparison of the curves in FIGS. 4*a* and 4*b* clearly indicates the improved bistable circuit obtained by incorporating the network 130 in accordance with this invention.

In order to return the bistable circuit of FIG. 3 to its original trigger state with transistor 60 and 62, respectively, conducting and nonconducting, a positive signal 150 is applied to the input terminal 118. This signal is differentiated by capacitor 120 and resistor 124 to provide a positive voltage spike via diode 122 to the base 84 of transistor 62. Transistor 62 goes into conduction sharply, and the lagging edge of the output signal 149 at output signal terminal 151 drops sharply. This sharp drop of potential is coupled to the base 78 of transistor 60 via resistor 92 and capacitor 94, and it falls below the point where collector-emitter conduction therein is sustained. With transistor 60 out of conduction, the original trigger state of the bistable circuit has been obtained.

It will be appreciated that a network in accordance with this invention can be incorporated in bistable circuits which use PNP transistors instead of the NPN trigger transistors illustrated in FIG. 3. Such a circuit, which incorporates network 159 in accordance with this invention, is shown in FIG. 5. PNP trigger transistors 160 and 162 replace the NPN trigger transistors 60 and 62, respectively, of FIG. 3 and an NPN shorting transistor 153 replaces the PNP shorting transistor 132. The other components in FIG. 5 are identical to those containing the same reference numerals in FIG. 3. However, the polarities of the supply voltages and polarity positions of the diodes are reversed.

In operation, negative input signals 164 and 166 are used to change the state of the bistable circuit of FIG. 5 instead of the positive input signals 116 and 150, respectively, used with FIG. 3. For example, if the bistable circuit of FIG. 4 is in the state where the transistor 162 is in conduction and transistor 160 is out of conduction, a negative input signal 164 applied to the input terminal 106 causes the state to change. A negative input signal to the input terminal 118 causes the circuit to return to its original state. The output signal 168 appears at output terminal 151. The fall time of the leading edge thereof is improved as result of network 159.

FIG. 6 illustrates a monostable circuit which incorporates network 170 in accordance with this invention. Transistors 172 and 174 of the NPN type have their emitters 176 and 178 connected to source of negative voltage $-V_8$ at terminal 182. Their collectors 184 and 186 are connected respectively by resistors 188 and 190 to source of positive voltage $+V_9$ at voltage supply terminal 192. The base 194 of transistor 172 is connected via resistor 196 to a source of negative D.C. potential $-V_{10}$ at voltage supply terminal which is more negative than $-V_8$. The diode 200 is connected across the base-to-emitter junction of transistor 172 to prevent the back bias thereof from exceeding the diode drop.

The collector 186 of transistor 174 is connected to the base 194 of transistor 172 by the parallel combination of resistor 202 and capacitor 204. The collector 184 of transistor 172 is connected via capacitor 206 and diode 208 to the base 210 of transistor 174. The junction 212 between diode 208 and capacitor 206 is connected by resistor 214 to voltage $+V_9$. Collectors 184 and 186 of transistors 172 and 174 are connected via diodes 216 and 218, respectively, to source of positive D.C. voltage $+V_{10}$ at voltage supply terminal 220 to prevent them from going more positive than it is.

Signal input terminal 234 is connected via capacitor 236 and diode 242 to the base 194 of transistor 172. Source of negative D.C. voltage $-V_{11}$ equal to $-V_8$ at voltage supply terminal 240 is connected via resistor 238 to junction 244 between capacitor 236 and diode 242. The capacitor 236, resistors 242 and voltage $-V_{11}$ differentiate and reference the positive input signal to the emitter 176 potential.

The network 170 in accordance with this invention is incorporated in the monostable circuit of FIG. 6 as follows. It includes PNP transistor 222, resistor 224 and capacitor 226. The emitter 228 of transistor 222 is connected $+V_{10}$ and the collector 230 is connected to the collector 186 of transistor 174 at junction 232. Resistor 224 is connected between the base 234 and emitter 228 of transistor 204 to reference the base to $+V_{10}$.

The operation of the monostable circuit shown in FIG. 5 will be understood through consideration of the waveforms shown in FIG. 6. For illustrative purposes, the network 170 in accordance with this invention will be excluded at first. The stable state of the circuit occurs with transistor 174 conducting and transistor 172 cut off. Positive signal 244 applied to the signal input terminal 234 is coupled by capacitor 236 and diode 242 to the base 194 of transistor 172. The relatively positive signal at the base 194 causes base current to flow, and the collector-emitter junction conducts to produce a sharp drop in collector 184 potential. The drop in potential is coupled by capacitor 206 to diode 208 which is then back biased. This causes base 210 current to stop flowing, and the collector-emitter junction of transistor 174 goes out of conduction.

Prior to the application of input signal 244 at signal input terminal 234, transistor 174 was conducting, its collector 186 was at approximately the negative voltage $-V_8$ connected to emitter 178. When the collector 184 of transistor 172 drops sharply in voltage, the collector 186 of transistor 174 rises therewith until its voltage is slightly above $+V_{10}$, at which time diode 218 conducts and thus clamps the collector 186 voltage to $+V_{10}$. This yields a sharp leading edge on the collector 184 waveform 246

(FIG. 7). The positive potential on collector 186 of transistor 174 raises the potential on the base 194 of transistor 172 and holds its collector-emitter junction in conduction.

When transistor 174 was in conduction, its base 210 was slightly more positive than its emitter 178; e.g., $-V_8$ plus the base-emitter junction voltage drop of transistor emitter junction voltage drop of transistor 174. This allowed capacitor 206 to charge from the voltage $+V_9$ so that its plates 252 and 254 were respectively plus and minus. The sudden drop in potential of collector 184 of transistor 172 as it goes into conduction causes a similar drop in potential at the junction 212 between resistor 214 and diode 208. This back biases the diode 208 and cuts off the base 210 current to transistor 174. The charging waveform at junction 212 is represented by waveform 209 of FIG. 7. The potential at the junction 212 begins to rise exponentially toward $+V_9$ represented by line 213 in FIG. 7, at a rate determined by the RC time constant of resistor 214 and capacitor 206. When the potential at junction 212 is more positive than the emitter 178 potential $-V_8$ of transistor 174 by two times the diode 208 bias potential, base 210 current will flow and the collector-emitter transistor 174 will again conduct. Since transistor 174 goes into conduction rather sharply, the trailing edge of the positive output voltage 256 from its collector 186 at output terminal 250 is sharp. This biases the base 194 of transistor 172 to the point where it no longer conducts and terminates current flow in the collector-emitter junction of the transistor. The duration of the relatively positive output signal of the circuit on terminal 250 is a function of the RC time constant of resistor 214 and capacitor 206.

When the network 170 in accordance with this invention is incorporated with the prior art monostable circuit, a very fast rise time in the leading edge of the waveform is obtained. The dotted line of waveform 260 indicates the results without the network 170. The solid line thereof indicates the results when it is incorporated.

The circuit of FIG. 6 is readily modified to utilize PNP transistors instead of NPN transistors 172 and 174 and an NPN transistor for the PNP transistor 222. It is necessary to reverse the polarities of the supply voltages, the input signal and diodes. Then, a negative output signal would be produced whose leading edge will be very sharp.

*Astable circuit*

An astable circuit incorporating a network 300 in accordance with this invention is shown in FIG. 8. NPN transistors 302 and 304 have their emiters 306 and 308, respectively, connected to D.C. supply voltage $-V_{12}$ at voltage supply terminal 310. Their collectors 312 and 314, respectively, are connected via resistors 316 and 318 to positive supply voltage $+V_{13}$ at supply voltage terminal 320 and via diodes 322 and 324, respectively, to positive clamping D.C. voltage $+V_{14}$ at clamping voltage supply terminal 326.

The collector 312 of transistor 302 is coupled by capacitor 328 via diode 330 to base 332 of transistor 304. There is a similar coupling arrangement between the collector 314 of transistor 304 and base 334 of transistor 302 comprising capacitor 336 and diode 338. The junction 331 between capacitor 328 and diode 330 is connected via resistor 333 to voltage $+V_{13}$ at terminal 320. Similarly, the junction 335 between capacitor 336 and diode 338 is connected via resistor 337 to $+V_{13}$.

The network 300 in accordance with this invention is connected to the astable circuit of FIG. 8 as follows. It includes transistor 340, resistor 342 and capacitor 344. The collector of transistor 340 is connected to collector 314 of transistor 304 at junction 348. The emitter 350 is connected directly to the clamping voltage $+V_{14}$, and the base 352 is coupled via capacitor 344 to collector 312 of transistor 302. Resistor 342 is connected between the base 352 and emitter 350 to reference the base at $+V_{14}$.

The operation of the circuit of FIG. 8, excluding the network 300 in accordance with this invention, is as follows. During one interval of time, the collector-emitter junction of transistor 302 conducts and the collector-emitter junction of transistor 304 is cut off. During the following interval, transistor 304 conducts and transistor 302 is cut off. Alternate conduction and cut off occurs for each transistor as long as voltages $-V_{12}$, $+V_{13}$ and $+V_{14}$ are applied to their respective voltage terminals. Capacitor 328 and resistor 333 serve as an RC network to determine the duration of conduction of transistor 302. Similarly, capacitor 336 and resistor 337 serve as another RC network to determine the duration of conduction of transistor 304.

For example, if the transistor 304 begins to conduct, its collector 314 potential drops toward its emitter 308 potential and provides a negative going transient through capacitor 336 to back bias diode 338 at junction 335, which prevents base 334 current from flowing into transistor 302. The potential at junction 335 rises toward the voltage $+V_{13}$, at a rate determined by the RC time constant of resistor 337 and capacitor 336. As soon as the potential at junction 335 is sufficiently above the emitter 306 potential $-_{12}$, diode 338 will no longer be back biased and the collector-emitter junction of transistor 302 conducts. This causes its collector 312 potential to drop toward the emitter potential $-V_{12}$ which back biases diode 330 via capacitor 328 to cut off base 332 current of transistor 304. The potential at junction 331 begins to rise toward voltage $+V_{13}$ at the rate determined by the RC time constant of resistor 333 and capacitor 328. As the potential at junction 331 increases sufficiently above the emitter 308 potential $-V_{12}$ of transistor 304, diode 330 is no longer back biased, and the collector-emitter junction thereof conducts. The rapid drop in potential at the collector 314 starts another cycle. Each time transistor 304 goes out of the and into conduction a positive signal 354 is produced at output terminal 356. As emphasized before, a transistor of the NPN type connected in the grounded emitter configuration as a basic inverter is sloped up in turning off due to the RC time constant associated with its collector. In particular, the resistor 318, capacitor 336, together with collector 314 capacitance determines the rate at which the potential at signal output terminal rises. Therefore, the lagging edge of the output signal 354 does not have the same short leading edge.

With the addition of the network 300, in accordance with this invention, to the astable circuit the leading edge is also changed rapidly. The explanation for this is as follows.

As transistor 304 is going out of conduction, transistor 302 is going into conduction. The collector 312 potential of the latter transistor drops rapidly. A negative signal is applied to the base 352 of PNP transistor 340 to initiate emitter-collector conduction therein. When transistor 340 conducts, the cut-off of transistor 304 occurs rapidly. The result is a sharp leading edge on output signal 354.

As in the previous inverter, bistable and monostable circuits, PNP transistors can be substituted for the NPN transistors 302, 304 and a NPN transistor substituted for PNP transistor 340, if the polarities of the D.C. voltage supplies and the diodes are reversed. The output signal will then be a series of negative going pulses.

While the invention has been particularly shown and described with reference to preferred embodiments thereof, it will be understood by those skilled in the art that various changes in form and details may be made therein without departing from the spirit and scope of the invention.

What is claimed is:

1. Signal translating apparatus including: a first transistor of a particular conductivity type connected in the common emitter configuration as a basic inverter; said first transistor having a first base, a first collector and a first emitter; an impedance; a signal input terminal connected to said first base via said impedance; a resistive-impedance; a first voltage source connected to said first collector via said resistive-impedance for supplying conduction current thereto; a signal output terminal connected to said first collector; a second transistor of opposite conductivity type having a second base, a second collector and a second emitter; a capacitor; said capacitor being connected between said signal input terminal and said second base; a resistor; said resistor being connected between said second base and said second emitter; diode means; said second emitter being connected to said first collector via said diode means; a second voltage source of the same polarity as the first voltage source but of lesser potential; said second emitter being connected to said second voltage source; and said second collector being directly connected to said first collector; whereby a signal to said first base via said input terminal of a polarity to terminate conduction therein is differentiated by said capacitor and said resistor to a signal of opposite polarity and applied to said second base to initiate conduction in said second transistor, thereby temporarily connecting said first collector via said second transistor to said second voltage source.

2. In an electrical circuit which includes:

(*a*) a first transistor of a particular conductivity type, said first transistor having base, emitter and collector electrodes;

(*b*) means for supplying operating signals to the base of said first transistor;

(*c*) means for connecting the emitter of said first transistor to a reference potential;

(*d*) a first voltage source supplying a potential of a predetermined polarity and magnitude different from said reference potential;

(*e*) resistive means connecting the collector of said first transistor to said first voltage source;

and which includes:

(*f*) a second voltage source supplying a second potential of the same polarity as the first voltage source but of a lesser magnitude different from the reference potential; and (*g*) a diode connecting the collector of said first transistor to said first voltage source to prevent the collector potential from rising substantially above the potential of said second voltage source;

the improvement in means for improving the rise time of a signal taken from the collector of the first transistor when the first transistor is rendered nonconductive comprising:

(*h*) a second transistor of a conductivity type opposite that of the first transistor and having base, emitter and collector electrodes;

(*i*) the collector of said second transistor being connected to the collector of said first transistor;

(*j*) the emitter of said first transistor being connected to said second voltage source; and (*k*) means for rendering said second transistor conductive when said first transistor is rendered nonconductive to temporarily connect the collector of said first transistor to said second voltage source and thereby allow the potential of the collector of the first transistor to rise from reference potential at a rate which is independent of the resistance of the resistive means connecting said collector of said first transistor to the first voltage source.

References Cited by the Examiner

UNITED STATES PATENTS

| | | | |
|---|---|---|---|
| 2,666,818 | 1/54 | Shockley | 307—88.5 |
| 2,874,315 | 2/59 | Reichert | 307—88.5 |
| 2,933,692 | 4/60 | Meyers | 307—88.5 XR |
| 3,023,323 | 2/62 | Kojalowicz | 307—88.5 |
| 3,114,049 | 12/63 | Blair | 307—88.5 |

OTHER REFERENCES

Henle: "The Application of Transistors to Computers," June 1958, Proceedings of the IRE, page 1248, FIG. 23.

Williams: "Transistor Chopper Drive Accurate Clock," pages 64 and 65, May 23, 1958, of Electronics Engineering Edition.

Electronic Engineering, May 1959, page 301 relied upon, FIG. 1.

JOHN W. HUCKERT, *Primary Examiner.*

GEORGE N. WESTBY, HERMAN KARL SAALBACH, ARTHUR GAUSS, *Examiners.*